United States Patent
Thomas

(10) Patent No.: US 7,721,926 B2
(45) Date of Patent: *May 25, 2010

(54) VEHICLE STORAGE STRUCTURE

(75) Inventor: Gregory P. Thomas, Canton, MI (US)

(73) Assignee: Nissan Technical Center Northe America, Inc., Farmington Hills, MI (US)

( * ) Notice: Subject to any disclaimer, the term of this patent is extended or adjusted under 35 U.S.C. 154(b) by 1233 days.

This patent is subject to a terminal disclaimer.

(21) Appl. No.: 11/268,607

(22) Filed: Nov. 8, 2005

(65) Prior Publication Data

US 2007/0102463 A1 May 10, 2007

(51) Int. Cl.
 B65D 43/12 (2006.01)
 B65D 43/20 (2006.01)
 B60R 7/04 (2006.01)
 B60R 11/00 (2006.01)

(52) U.S. Cl. ............... 224/554; 224/275; 296/37.8; 296/24.46; 220/345.3; 220/351

(58) Field of Classification Search ........... 224/275, 224/554; 220/345.1, 351, 345.3; 396/37.8, 396/24.46; 206/816
See application file for complete search history.

(56) References Cited

U.S. PATENT DOCUMENTS

| | | | | |
|---|---|---|---|---|
| 3,460,878 A * | 8/1969 | Appel et al. | ................ | 312/297 |
| 3,645,417 A * | 2/1972 | Leal | ................ | 220/345.1 |
| 5,179,987 A * | 1/1993 | Mannato | ................ | 150/118 |
| 5,577,629 A * | 11/1996 | Rosler | ................ | 220/525 |
| 5,761,750 A * | 6/1998 | Mazzola et al. | ................ | 4/500 |
| 6,478,204 B2 | 11/2002 | Lange et al. | | |
| 6,499,785 B2 * | 12/2002 | Eguchi | ................ | 296/37.8 |
| 6,530,478 B1 * | 3/2003 | Kanoyadani et al. | ................ | 206/538 |
| 6,672,554 B2 * | 1/2004 | Fukuo | ................ | 248/311.2 |
| 6,681,529 B1 * | 1/2004 | Baloga et al. | ................ | 52/29 |
| 6,883,852 B2 * | 4/2005 | Laskey | ................ | 296/37.8 |
| 7,063,227 B2 * | 6/2006 | Looker | ................ | 220/345.1 |
| 7,287,795 B1 * | 10/2007 | Thomas | ................ | 296/24.34 |
| 7,475,954 B1 * | 1/2009 | Latunski | ................ | 312/297 |
| 7,540,391 B2 * | 6/2009 | Kato | ................ | 220/252 |
| 2002/0070220 A1 * | 6/2002 | Kuehn et al. | ................ | 220/350 |

FOREIGN PATENT DOCUMENTS

JP 08192685 A * 7/1996

* cited by examiner

Primary Examiner—Nathan J Newhouse
Assistant Examiner—John Cogill
(74) Attorney, Agent, or Firm—Global IP Counselors, LLP

(57) ABSTRACT

A vehicle trim component that has a concealed storage compartment includes a mounting portion and a pair of generally parallel tracks that at least partially define an access opening of the trim component. A flexible lid slidably is disposed between the tracks for movement between a closed position and an open position relative to the access opening. The lid includes a flexible portion and a reinforcement portion coupled to the flexible portion. The flexible portion is configured and arranged to span the access opening when the lid is in the closed position. The reinforcement portion has an array of sliding members and an array of hard, rigid reinforcement inserts. Free ends of each of the reinforcement inserts are located in the tracks. The sliding members are disposed on each of the reinforcement inserts to isolate the reinforcement inserts from contacting the tracks.

30 Claims, 13 Drawing Sheets

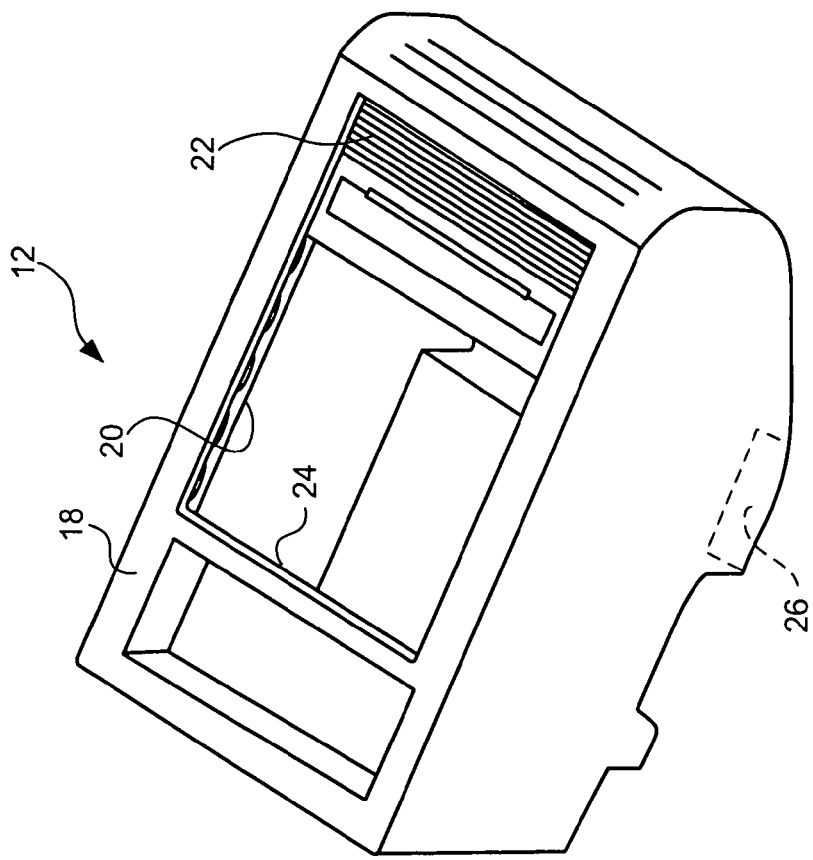
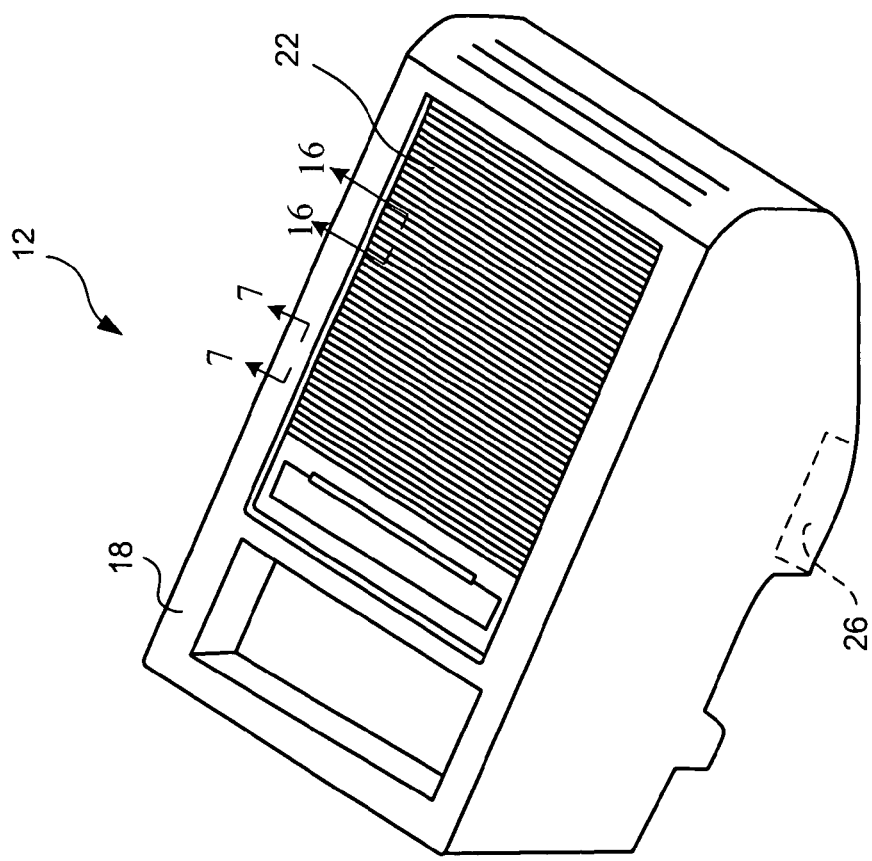

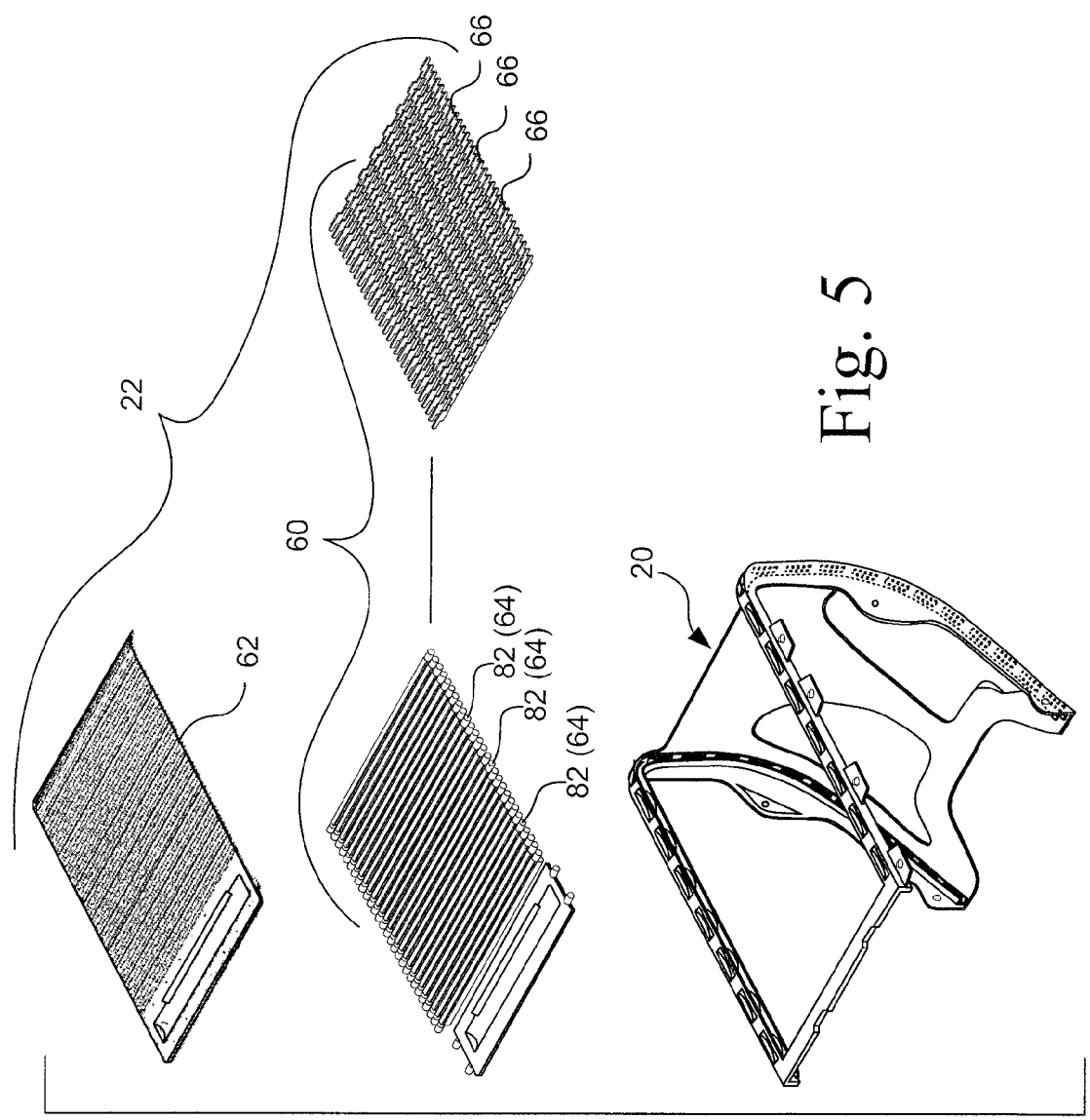

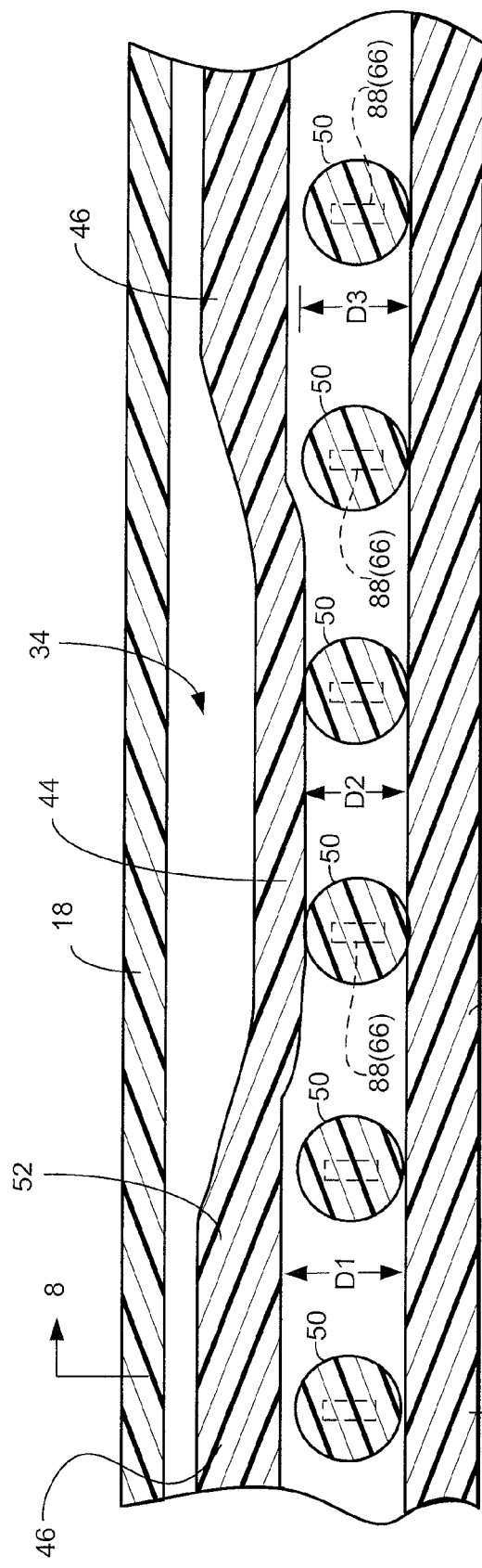
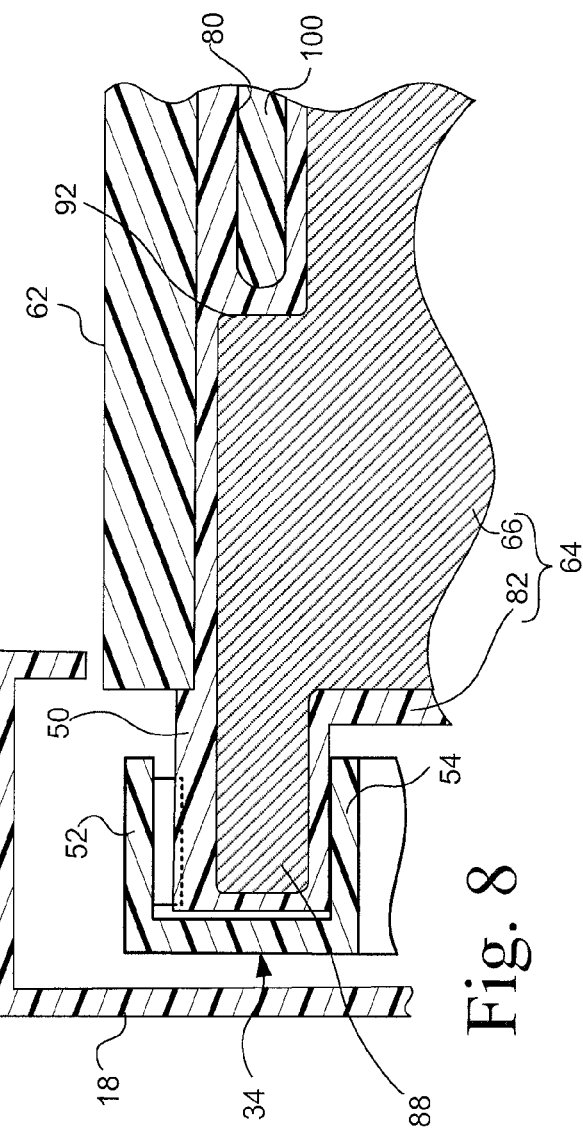

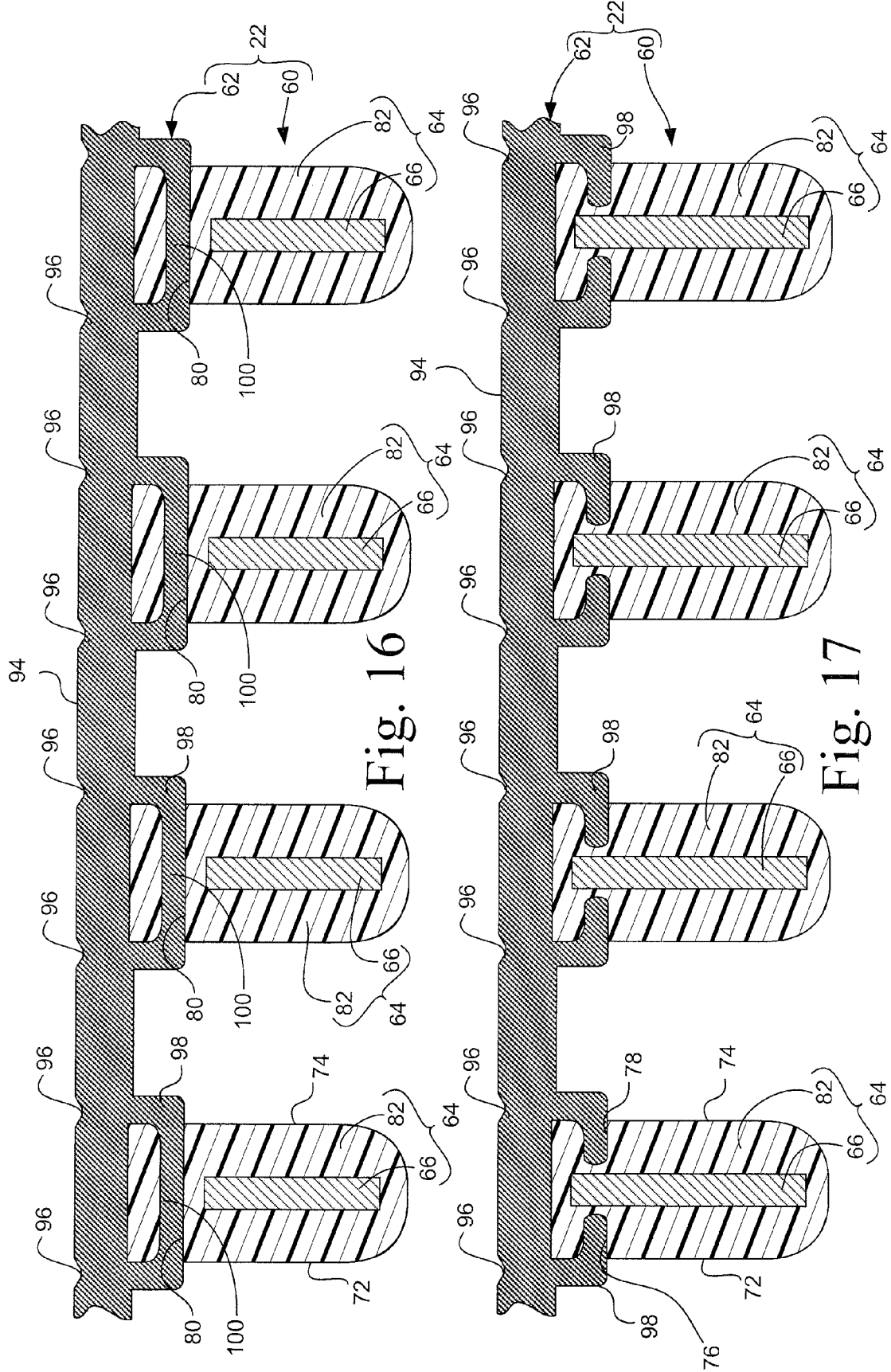

VEHICLE STORAGE STRUCTURE

BACKGROUND OF THE INVENTION

1. Field of the Invention

The present invention generally relates to vehicle storage structure. More specifically, the present invention relates to storage structure that includes a sliding lid that is reinforced with ribs having rigid inserts for added strength.

2. Background Information

Vehicles are continually being redesigned and improved for safety and functionality. One area of continuing redesign concerns the storage areas within the vehicle. Storage compartment covers or doors that are based on a single pivot opening type design can sometimes interfere with seat armrests if the covers or doors need to open through the space used by the seat armrests. This causes the size of the storage compartment to be reduced so that the single pivot opening type cover or door to be able to be opened in between the seat armrests.

In recent years, storage structures with sliding lids have been employed, where the sliding lid is moveable between a pair of parallel tracks and can retract within the interior of the storage structure thereby maximizing storage size. However, there are several drawbacks to the use of such sliding lids on storage compartments. For example, such lids typically lack sufficient strength to withstand the weight of a heavy object, should the heavy object be leaned heavily against or set on the lid. Additionally, such lids can slide open if only partially closed.

In view of the above, it will be apparent to those skilled in the art from this disclosure that there exists a need for an improved storage compartment and sliding lid that overcomes the above drawbacks. This invention addresses these needs in the art as well as other needs, which will become apparent to those skilled in the art from this disclosure.

SUMMARY OF THE INVENTION

It has been discovered that in order to maximize convenient storage space within a vehicle, it is desirable to have a sliding lid that retracts into the storage structure.

One object of the present invention is to provide a sliding lid with sufficient strength to withstand large forces.

Another object of the present invention is to provide a storage structure with a means for tuning the effort feel to the customer throughout the range of operation and restraining movement of the sliding lid when the sliding lid is not completely closed.

In accordance with one aspect of the present invention, a vehicle storage structure includes a vehicle trim component and a flexible lid. The vehicle trim component has a mounting portion and a pair of generally parallel tracks that at least partially define an access opening of the trim component. The flexible lid is slidably disposed between the tracks for movement between a closed position and an open position relative to the access opening. The lid basically includes a flexible portion and a reinforcement portion coupled to the flexible portion. The flexible portion is further configured and arranged to span the access opening when the lid is in the closed position. The reinforcement portion has an array of sliding members and an array of hard, rigid reinforcement inserts that are disposed at generally parallel spaced apart locations. Opposite free ends of each of the reinforcement inserts are located in the tracks and the sliding members are disposed on at least the free ends of each of the reinforcement inserts to isolate the reinforcement inserts from contacting the tracks.

In accordance with another aspect of the present invention, a vehicle storage structure includes a vehicle trim component and a flexible lid. The vehicle trim component has a mounting portion and a pair of generally parallel tracks that at least partially define an access opening of the trim component. Each of the tracks includes a plurality of spaced apart narrowed portions and a plurality of guide portions disposed between the narrowed portions. The flexible lid includes a plurality of posts extending laterally from opposite sides of the lid into the tracks for sliding movement between a closed position and an open position relative to the access opening. The posts are dimensioned to freely slide along the guide portions of the track and are under compression at the narrowed portions of the track.

In accordance with another aspect of the present invention, a vehicle storage structure has a vehicle trim component and a flexible lid. The vehicle trim component includes a mounting portion and a pair of generally parallel tracks that at least partially define an access opening of the trim component. The flexible lid is slidably disposed between the tracks for movement between a closed position and an open position relative to the access opening. The lid basically includes a flexible portion and a reinforcement portion coupled to the flexible portion. The flexible portion is configured and arranged to span the access opening when the lid is in the closed position. The reinforcement portion includes an array of reinforcement ribs. Each reinforcement rib has a first lateral side and a second lateral side with at least one aperture extending from the first lateral side to the second lateral side. Further, a respective section of the flexible portion extends completely through the aperture forming a bridged connection between the flexible portion and the reinforcement portion.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 3 is a perspective view of the storage structure removed from the vehicle showing a lid in a closed position in accordance with the present invention;

FIG. 4 is a perspective view of the storage structure removed from the vehicle showing the lid in an open position in accordance with the present invention;

FIG. 5 is an exploded perspective view of the storage structure showing a track structure, a flexible portion of the lid and an array of sliding members of the lid in accordance with the present invention;

FIG. 7 is a cross-sectional elevation of a portion of the track structure taken along the line 7-7 in FIG. 3, showing details of one of a pair of tracks and posts of the lid that contact the tracks in accordance with the present invention;

FIG. 8 is a cross-sectional side view of a portion of the track structure taken along the line 8-8 in FIG. 7, showing details of the track and the posts in accordance with the present invention;

FIG. 16 is a cross-sectional side view of the lid taken along the line 16-16 in FIG. 3 showing the bridge connection of the flexible portion in accordance with the present invention; and FIG. 17 is another cross-sectional side view of the lid taken along the line 17-17 in FIG. 15, showing inner extensions of the flexible portion that extend into recesses formed in the sliding members in accordance with the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
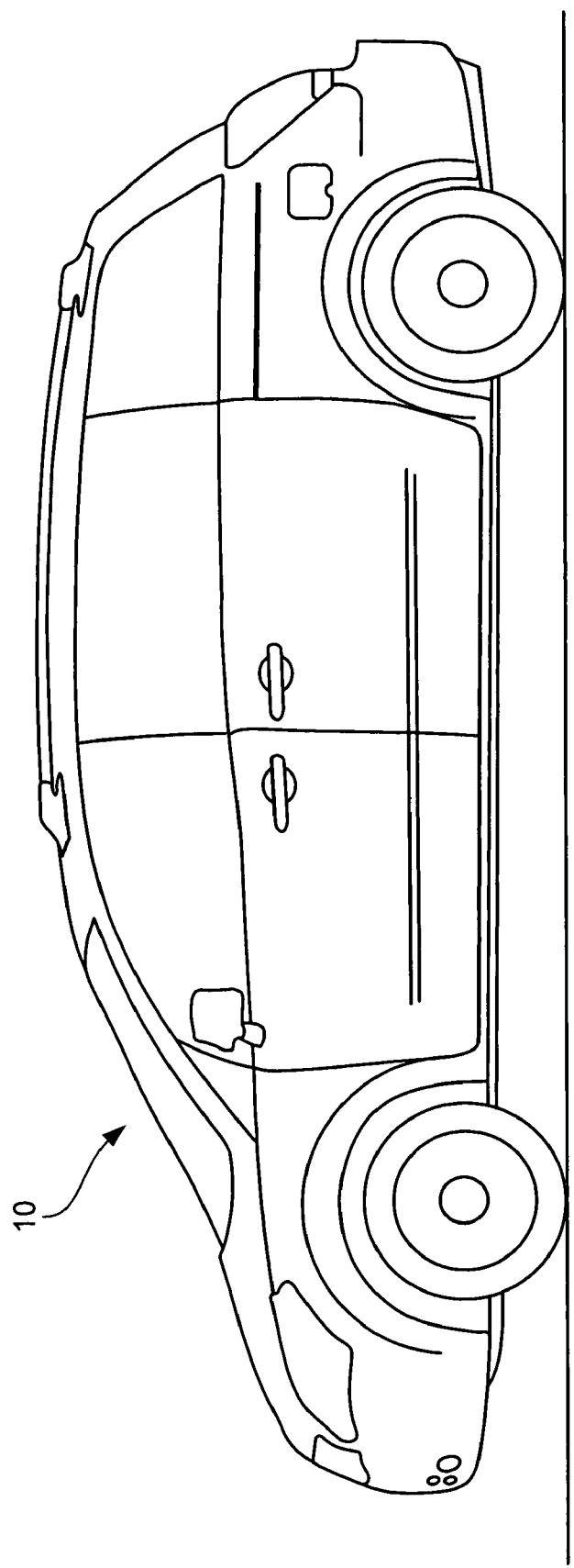
FIG. 1 is a side elevational view of a vehicle in accordance with one embodiment of the present invention.
Figure 2:
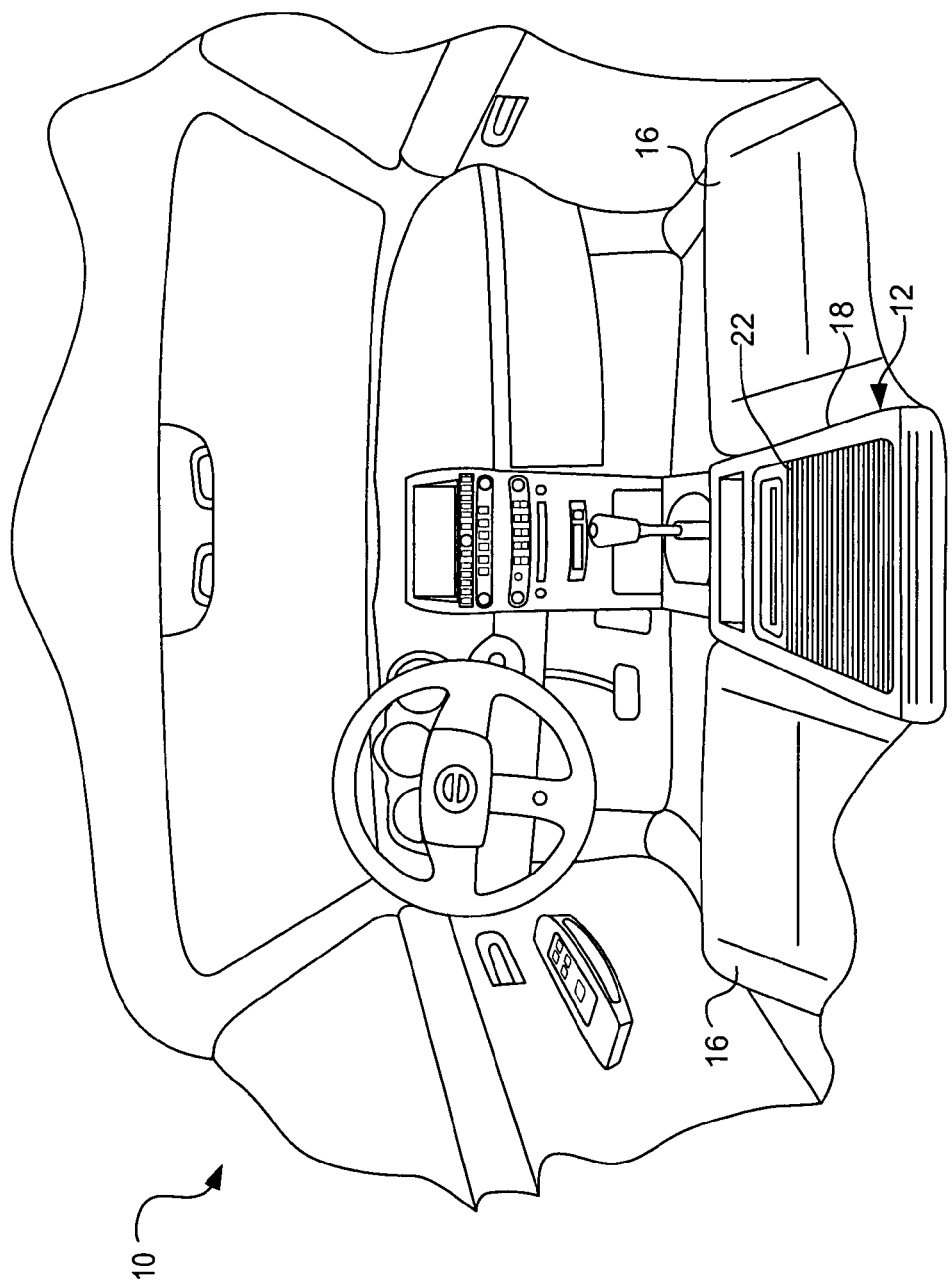
FIG. 2 is a perspective view of the interior of the vehicle depicted in FIG. 1 showing a center console that includes a storage structure in accordance with the present invention.

Referring initially to FIGS. 1 and 2, a vehicle 10 is illustrated that includes a storage structure 12 (shown in FIG. 2) in accordance with a first embodiment of the present invention. In this illustrated embodiment, the storage structure 12 is a center console that is installed between front seats 16 of the vehicle 10. Preferably, the storage structure 12 is designed as a trim component that blends in with the interior features of the vehicle 10. Further, in alternative embodiments, the storage structure 12 can be shaped and arranged for installation in any of a variety of locations within the vehicle 10. For example, the storage structure 12 can also be re-shaped and installed in a dashboard area of the vehicle 10, on the roof within the vehicle 10, beside or between rear seats (not shown) or other rearward locations within the vehicle 10.

As shown in FIGS. 3 and 4, the storage structure 12 includes an outer shell 18, a track structure 20 (only partially shown in FIG. 4) and a lid 22. The outer shell 18 includes an access opening 24 (FIG. 4) that permits access to a concealed storage compartment that is covered by the lid 22 with the lid 22 in a closed position, as shown in FIG. 3. The lid 22 is slidable along the track structure 20 between the closed position and an open position shown in FIG. 4.

The outer shell 18 can be a single pre-formed carcass or can be a series of panels attached to the track structure 20 and/or to one another and installed within the vehicle 10. The outer shell 18 preferably includes two or more mounting portions 26 (only one shown in FIGS. 3 and 4) used to fix the storage structure 12 to the vehicle 10.

Referring now to FIG. 5, various elements of the storage structure 12 are shown with the outer shell 18 removed for greater clarity. Specifically, the track structure 20 and portions that comprise the lid 22 are depicted in FIG. 5 and described in greater detail below.

Figure 6:
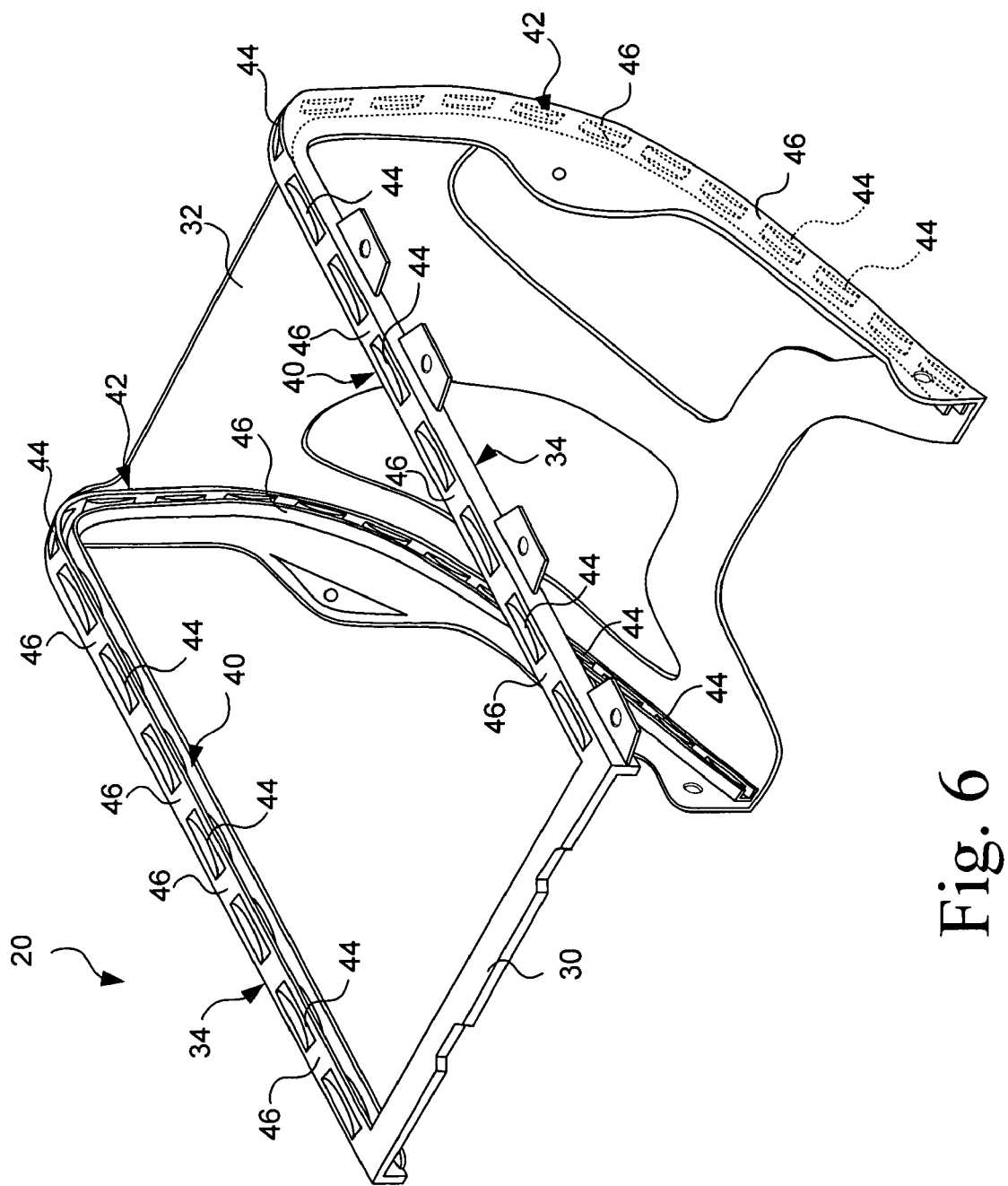
FIG. 6 is a perspective view showing the track structure with other portions of the storage structure removed to provide greater clarity in accordance with the present invention.

As shown more clearly in FIG. 6, the track structure 20 basically includes support flanges 30 and 32 and a pair of parallel tracks 34. The support flanges 30 and 32 extend between the parallel tracks 34 maintaining the tracks 34 at a constant spaced apart distance. The track structure is preferably formed of a molded thermoplastic material, such as acetal polyoxymethylene, polyformaldehyde, polyacetal compounds, or other similar materials. The track structure 20 can be formed as a single unitary member or can be constructed of several individual components that are molded, bonded or otherwise fastened together. The track structure 20 is preferably fastened to the interior of the outer shell 18 by fasteners (not shown) or bonded thereto using adhesives or thermoplastic material bonding.

The tracks 34 are generally mirror images of one another, extend parallel to one another. Each of the tracks 34 includes a straight portion 40 and a curved portion 42. The straight portions 40 are disposed on opposite sides of the access opening 24 of storage structure 12 at least partially defining the access opening 24 (see FIG. 4). Each of the tracks 34 includes a plurality of spaced apart narrowed portions 44 and a plurality of guide portions 46 disposed between the narrowed portions 44. The narrowed portions 44 are configured to apply a compressive force on a plurality of posts 50 of the lid 22 to restrict movement of the lid 22 along the lengths of the tracks 34. As described in greater detail below, the lid 22 is integrally formed with a plurality of posts 50 that extend into the tracks 34.

As shown more clearly in FIGS. 7 and 8, each of the tracks 34 includes a first wall 52 and a second wall 54 that are spaced apart from one another. In the guide portions 46, the first and second walls 52 and 54 are spaced apart from one another by a first distance $D_1$. In the narrowed portions 44, the first and second walls 52 and 54 are spaced apart from one another by a second distance $D_2$. The posts 50 have a diameter $D_3$. In the first embodiment of the present invention, the distance $D_1$ is larger than the distance $D_2$ and the diameter $D_3$ is equal to or smaller that the distance $D_1$ but larger than the distance $D_2$. As a result, the first and second walls 52 and 54 in the narrowed portions 44 exert a compressive force against opposing top and bottom sides of the posts 50. The first and second walls 52 and 54 are preferably made of a material that is slightly more flexible than that of the posts 50 and will flex slightly to allow the lid 22 to be opened and closed. However, the compressive force exerted in the narrowed portions 44 of the tracks 34 on the posts 50 of the lid 22 controls the feel of effort and restricts movement of the lid 22. Specifically, the lid 22 is controlled for consistent feel of during assisted movement and restrained against unassisted movement along the tracks 34. In other words, a passenger within the vehicle 10 can push the lid 22 back and forth between the open position and the closed position with a consistent feel of effort, but the lid 22 does not move unassisted due to the narrowed portions 44.

As indicated in FIG. 6, the narrowed portions 44 are located repeatedly along the entire track 34 distance. Consequently, the lid 22 is controlled for consistent feel of effort and is restrained against unassisted movement along the tracks 34 regardless of whether or not the lid 22 is in the closed position or the open position.

With reference again to FIG. 5, the lid 22 is flexible allowing it to move from the closed position shown in FIG. 3 to the open position shown in FIG. 4, as described in greater detail below. The flexibility of the lid 22 also allows it to move from the straight portions 40 to the curved portions 42 of the tracks 34.

As shown in FIG. 5, the lid 22 basically includes a reinforcement portion 60 and a flexible portion 62. The reinforcement portion 60 basically includes an array of sliding members 64 and an array of hard, rigid reinforcement inserts 66. The sliding members 64 are disposed at generally parallel spaced apart locations along the length of the lid 22.

Figure 9:
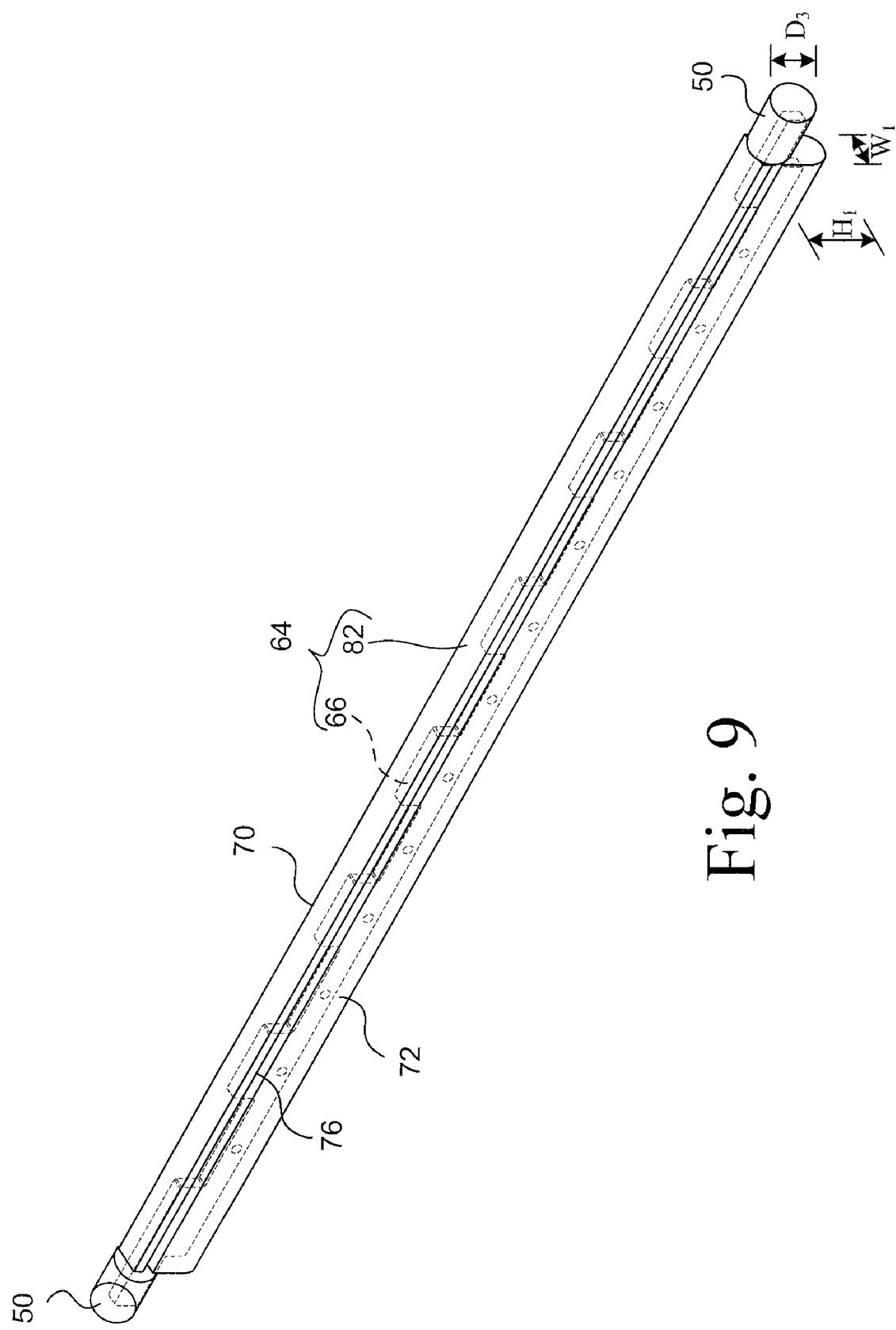
FIG. 9 is a perspective view of one of the sliding members removed from the lid, showing posts at either end of the sliding member and a reinforcement insert embedded within the sliding member, in accordance with the present invention.
Figure 13:
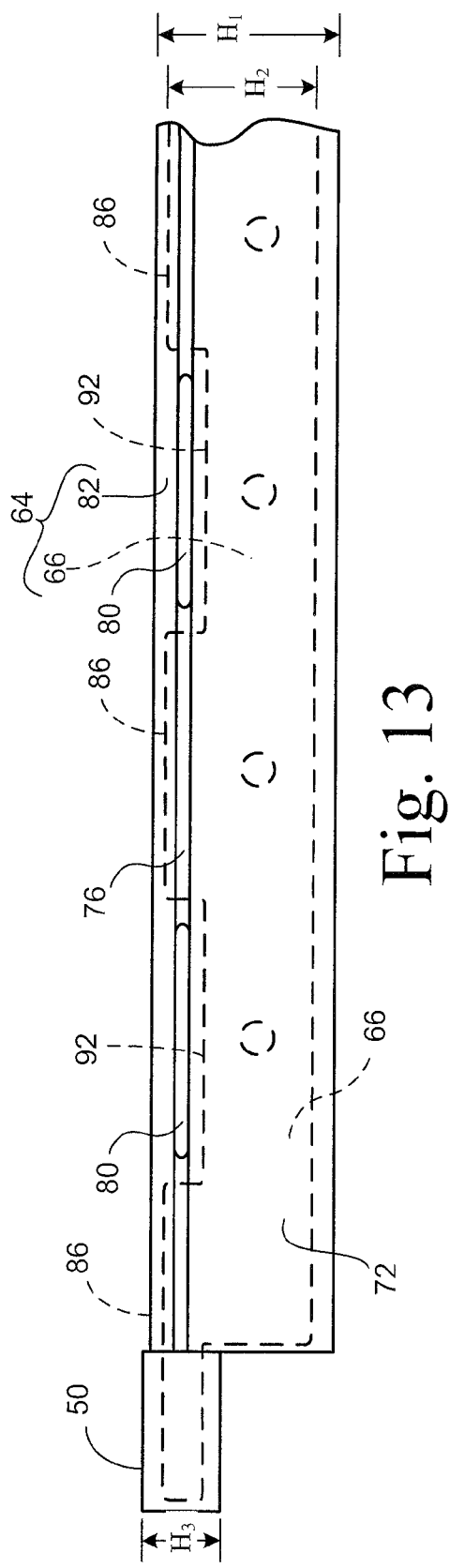
FIG. 13 is a fragmentary side elevation of a first side of the sliding member shown removed from the lid in accordance with the present invention.
Figure 14:
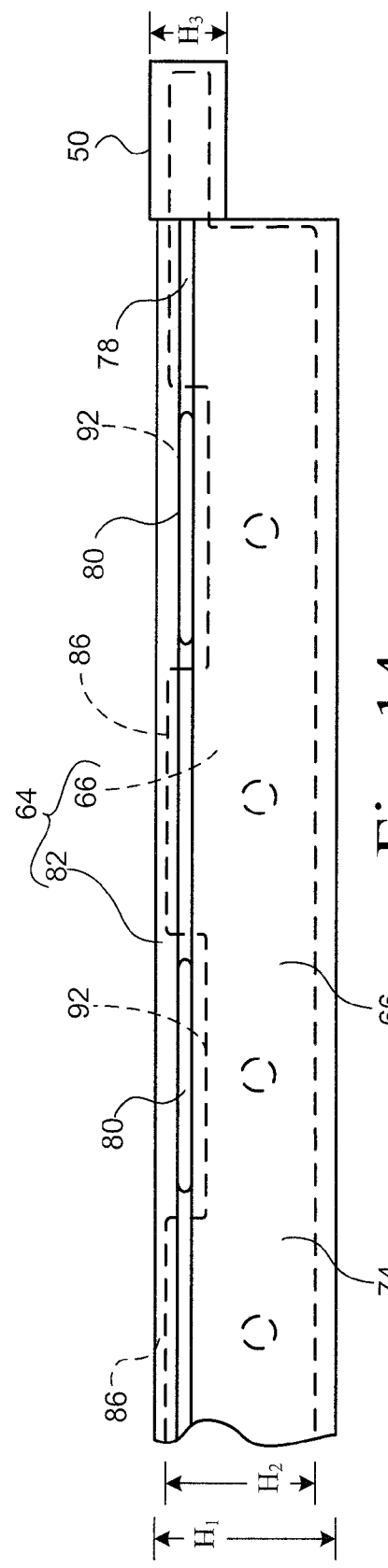
FIG. 14 is a fragmentary side elevation of a second side of the sliding member shown removed from the lid in accordance with the present invention.

With reference now to FIGS. 9, 13 and 14, the sliding members 64 are now described in greater detail. Since the sliding members 64 are all generally the same, a description of one of the sliding members 64 applies to all the sliding members 64. Accordingly, FIGS. 9, 13 and 14 show only one sliding member 64. The sliding member 64 basically includes a corresponding one of the reinforcement inserts 66, a pair of the posts 50, a center rib section 70 that extends between the posts 50, a first lateral side 72 (FIGS. 9 and 13), a second lateral side 74 (FIG. 14), a first recess 76 formed on the first lateral side 72 (FIG. 13), a second recess 78 (FIG. 14) formed on the second lateral side 64 and a plurality of apertures 80 (FIGS. 13 and 14) that extend from the first recess 76 to the second recess 78.

Figure 12:
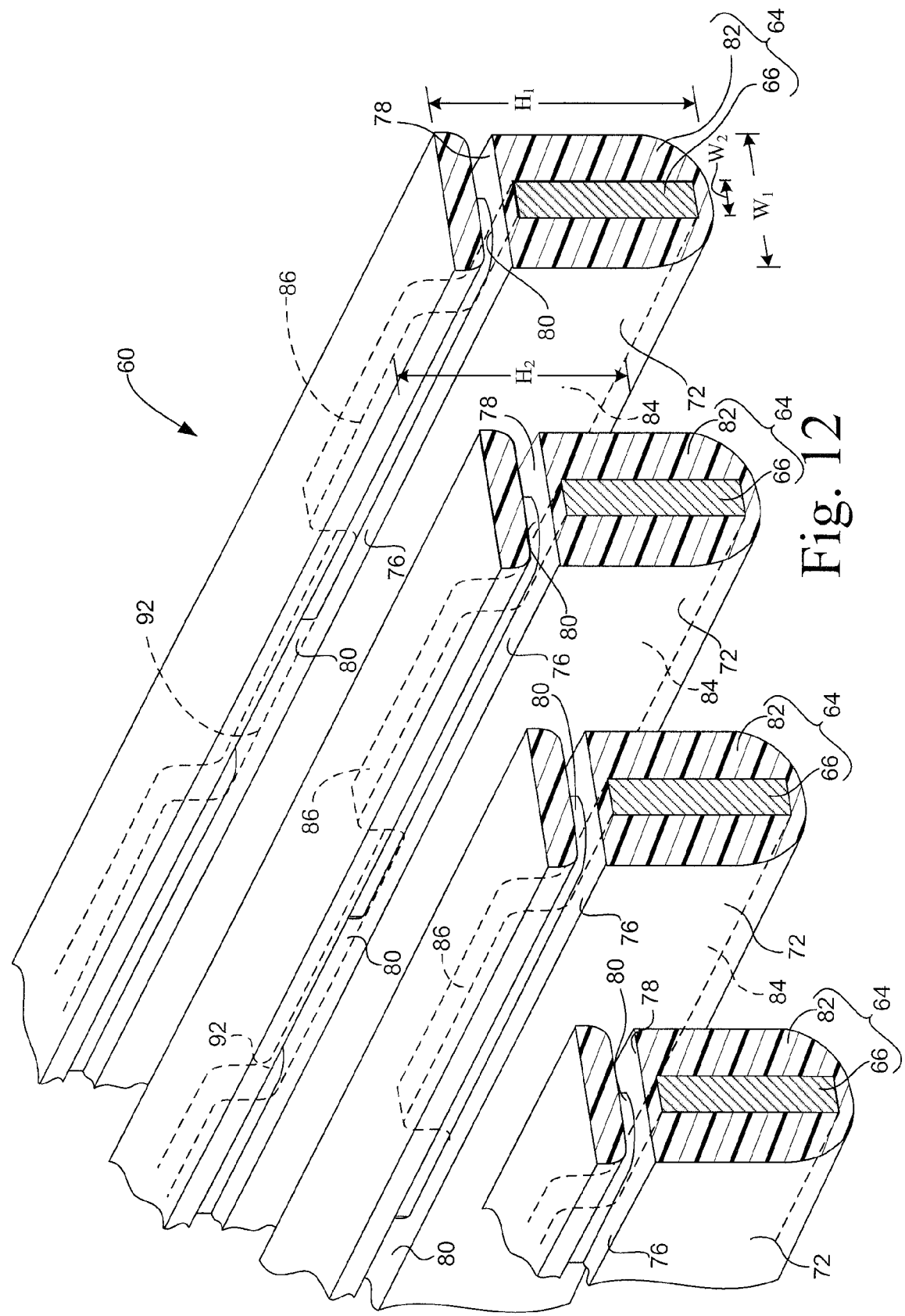
FIG. 12 is a partial cross-sectional, perspective view of several of the sliding members in an arrangement that corresponds to their relative locations within the lid in accordance with the present invention.

Each sliding member 64 serves as a reinforcement rib that provides strength to the lid 22. Each sliding member 64 is at least partially formed with an outer reinforcing material 82 made of a nylon or nylon like material that at least partially surrounds a corresponding one of the reinforcement inserts 66. Preferably, each of the sliding members 64 are formed by completely surrounding or encasing a corresponding one of the reinforcement inserts 66 with the outer reinforcing material 82. As is best shown in FIG. 9, the outer reinforcing material 82 (shown in solid lines in FIG. 9) surrounds and preferably encompasses or encases the reinforcement insert 66 (shown in phantom lines in FIG. 9). Therefore, each of the sliding members 64 (reinforcement ribs) includes a rigid reinforcement insert 66 embedded in the outer reinforcing material 82 (such as nylon). The outer reinforcing material 82 is preferably less rigid than the reinforcement insert 66. Further, each sliding member 64 has a height $H_1$ measured perpendicular to a plane defined by the access opening 24 that is greater than a width $W_1$ of the sliding member, as shown in FIGS. 9 and 12. Hence, each sliding member 64 is a separate member that has a respective one of the reinforcement inserts 66 that is surrounded, encased and/or embedded within corresponding outer reinforcing material 82. The reinforcement portion 60 of the lid 22 includes a plurality of the sliding members 64.

Figure 10:
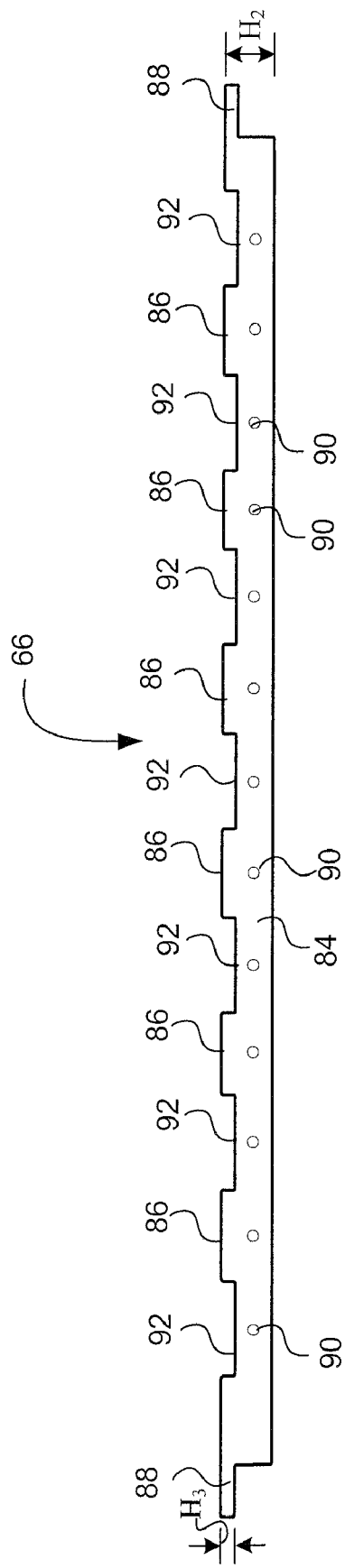
FIG. 10 is a side elevational view of the reinforcement insert shown removed from the sliding member in accordance with the present invention.

Referring now to FIG. 10, the reinforcement insert 66 of the reinforcement portion 60 is now described in greater detail. As with the sliding members 64, since each of the reinforcement inserts 66 is generally the same. Accordingly, description of one of the reinforcement inserts 66 applies generally to all.

The reinforcement insert 66 is preferably a one-piece member that is made of a metal material or other rigid material that can provide strength to the lid 22. The reinforcement insert 66 is at least partially (if not completely) embedded or encased within the corresponding one of the sliding members 64.

The reinforcement insert 66 basically is an elongated member that is formed with a central rib portion 84, a plurality of longitudinally spaced apart extensions 86, two end protrusions 88 and a plurality of holes 90 in the central rib portion 84. The reinforcement inserts 66 basically has a rectangular cross-section at the central rib portion 84, as indicated in FIGS. 11, 12 and 15-17. As shown in FIG. 10, a plurality of gaps 92 or concaved regions are defined between adjacent pairs of the extensions 86.

Figure 11:
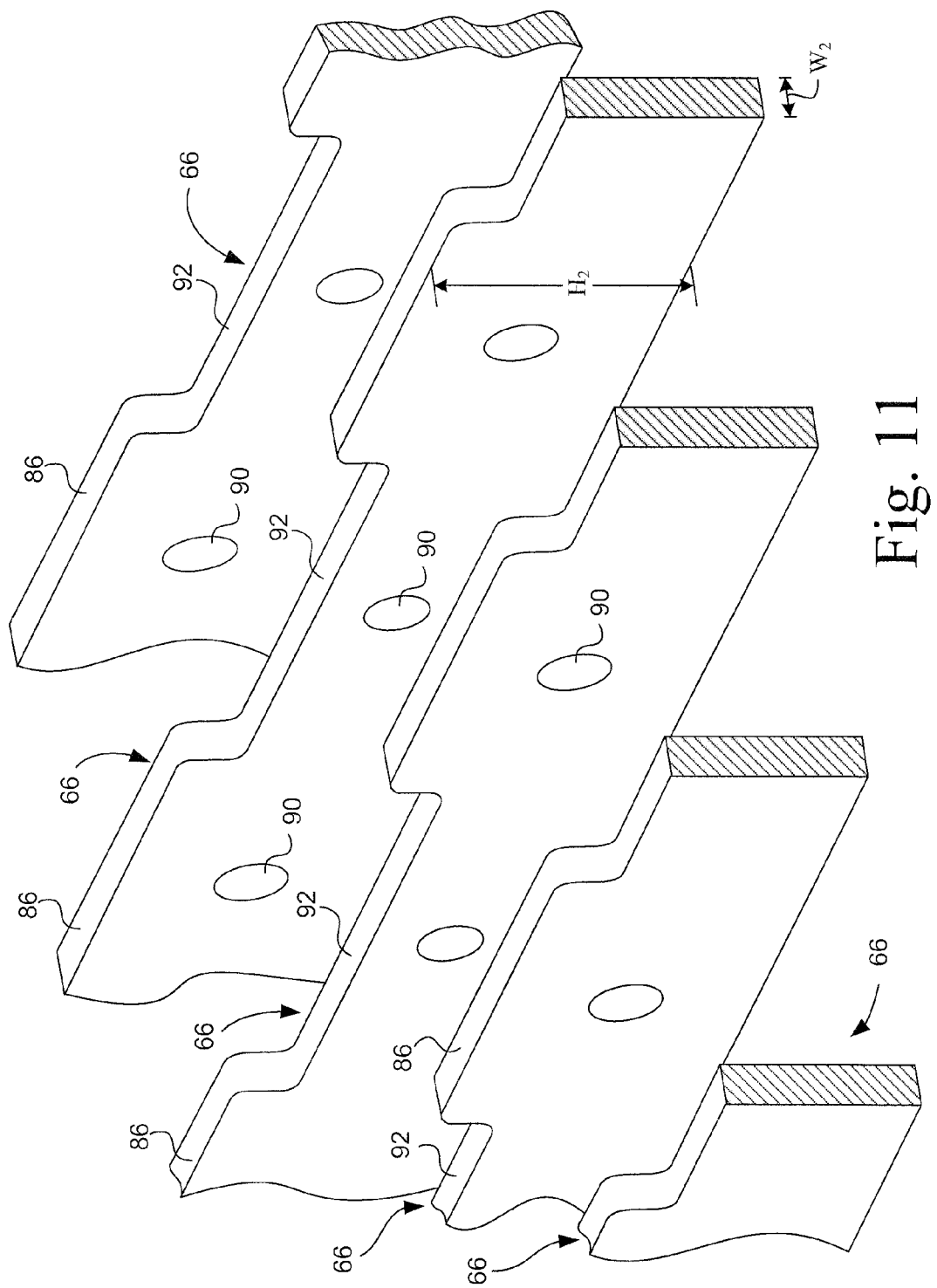
FIG. 11 is a partial cross-sectional, perspective view of several of the reinforcement inserts in an arrangement that corresponds to their relative locations within the lid in accordance with the present invention.

As shown in FIGS. 12, 13 and 14, the central rib portion 84 of the reinforcement insert 66 has a height $H_2$ measured at the extensions 86 that extends in a direction that is perpendicular to the plane defined by the access opening 24. The reinforcement insert 66 further has a width $W_2$ as shown in FIGS. 11 and 12. The height $H_2$ of the reinforcement inserts 66 is greater than the width $W_2$. Further, the height $H_2$ of the reinforcement inserts 66 is less than the height $H_1$ of the sliding member 64, as shown in FIGS. 12, 13 and 14. As well, the width $W_2$ of the reinforcement inserts 66 is less than the width $W_1$ of the sliding member 64 as shown in FIG. 12.

The protrusions 88 have a height $H_3$ that is less than half of the height $H_2$ measured downward from the top of the extensions 86 in FIG. 10. The protrusions 88 are embedded or encased within the post 50 and extend into the tracks 34, as indicated in FIGS. 7 and 8.

As also shown in FIGS. 7 and 8, the posts 50 extend into the tracks 34. The posts 50 are generally cylindrical in shape with a circular cross-section disposed on opposite free ends of the sliding member 64. Each of the protrusions 88 of the reinforcement insert 66 is completely encompassed by the posts 50. Accordingly, the protrusions 88 extend into the tracks 34 but are isolated and spaced apart from the tracks 34. Specifically, the protrusions 88 do not contact the tracks 34.

As indicated in FIGS. 13 and 14, the center rib section 70 of the sliding member 64 is formed around the reinforcement insert 66 along with the remainder of the slider member 64. Preferably, portions of the central rib section 70 extend into and through the holes 90 in the center rib portion 84 of the reinforcement insert 66 forming a secure mechanical connection between the reinforcement insert 66 and the sliding member 64. The center rib sections 70 extend generally parallel to one another and approximately perpendicular to the tracks 34.

As shown in FIGS. 12, 13 and 17, the first lateral side 72 of the sliding member 64 is formed with the first recess 76. The first recess 76 extends lengthwise the entire length of the first lateral side 72 from one of the posts 50 to the other of the posts 50. As shown in FIGS. 14 and 17, the second lateral side 74 of the sliding member 64 is formed with the second recess 78. The second recess 78 extends lengthwise the entire length of the second lateral side 74 from one of the posts 50 to the other of the posts 50.

The plurality of apertures 80 are now described with specific reference to FIGS. 8, 12-14, 16 and 17. Each aperture 80 extends from the first recess 76 in the first lateral side 72 of the center rib section 70 to the second recess 78 in the second lateral side 74 of the sliding member 64. As shown in FIGS. 13 and 14, the apertures 80 aligned and located between adjacent ones of the extensions 86. Consequently, the apertures 80 extend through the gaps 92 defined on the reinforcement inserts 66 between adjacent ones of the extensions 86.

The sliding members 64 are preferably molded individually, but for illustration purposes, several of the sliding members 64 are depicted in FIG. 12. Initially, the reinforcement inserts 66 are formed individually as separate elements. Several of the reinforcement inserts 66 are depicted in FIG. 11 in a pattern similar to the sliding members 64 shown in FIG. 12. For each sliding member 64, one reinforcement insert 66 is put into a mold (not shown) and held in position within the mold via the holes 90. A plastic, polymer or nylon material is inserted into the mold such that the sliding member 64 is molded around the reinforcement insert 66. Accordingly, for the reinforcement inserts 66 shown in FIG. 11, a corresponding set of sliding members 64 is formed, as shown in FIG. 12. Subsequently, the flexible portion 62 is molded around an upper portion of the array of the sliding members 64 to form the lid 22, as depicted in FIG. 15.

Figure 15:
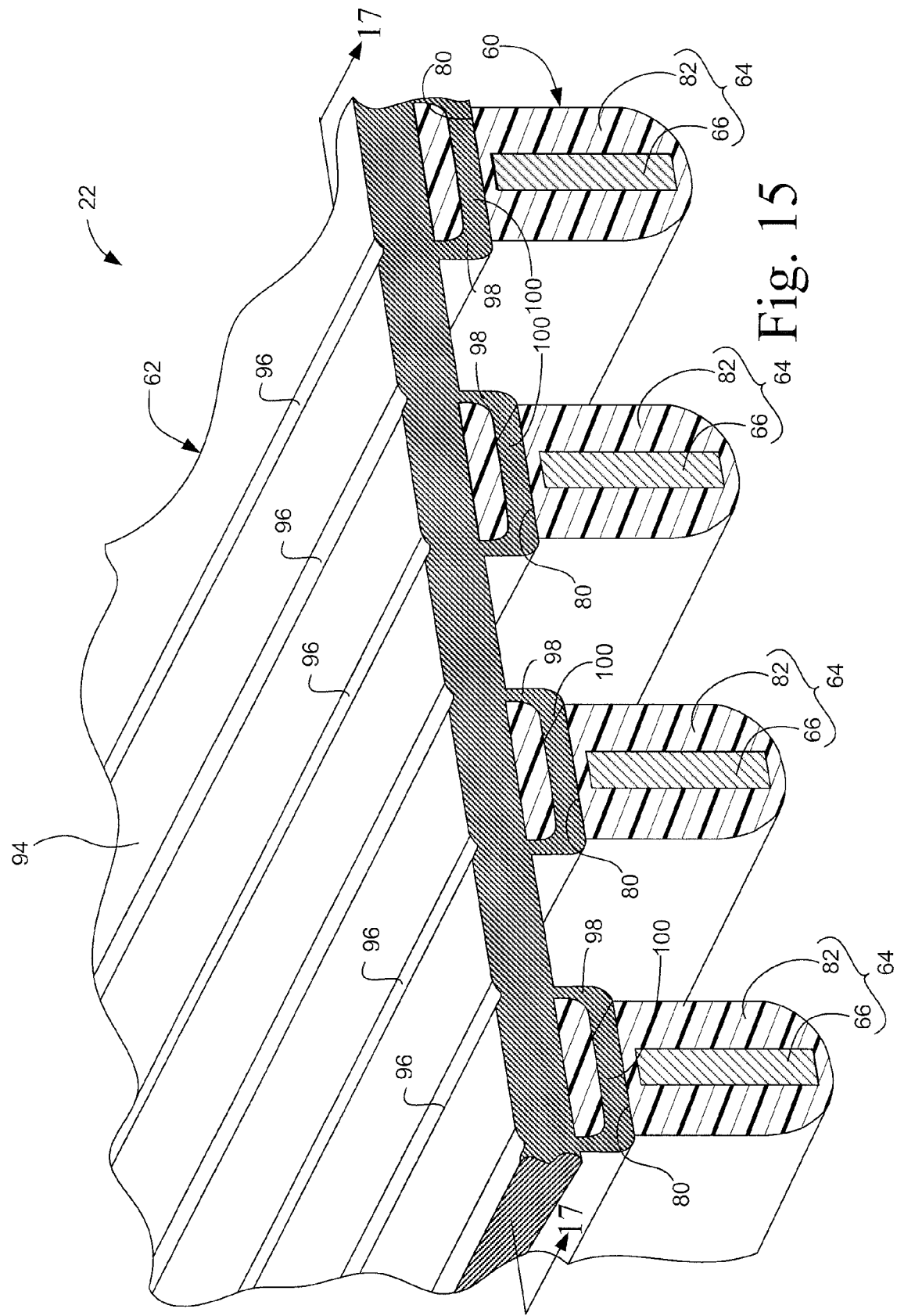
FIG. 15 is a partial cross-sectional, perspective view of the lid showing a bridge connection of the flexible portion that fixes the flexible portion to the sliding members in accordance with the present invention.

With specific reference to FIGS. 15, 16 and 17, the flexible portion 62 is now described in greater detail. The flexible portion 62 is configured and arranged to span the access opening 24 when the lid 22 is in the closed position (FIG. 3). The flexible portion 62 is also fixedly connected to each of the sliding members 64 of the reinforcement portion 60. The flexible portion 62 is at least mechanically connected to each of the sliding members 64, as described further below. Further, the flexible portion 62 is molded around upper regions of each of the sliding members 64 optionally making a bond or adhesive connection therebetween.

The flexible portion 62 is basically an elongated flexible flat member formed of, for example, a Hytrel® material or other flexible thermo plastic, or elastomeric material. As shown in FIGS. 15, 16 and 17, the flexible portion 62 is formed as a single continuous element that includes several shaped regions such as an outer surface 94 formed with a plurality of grooves or recesses 96 and a plurality of inner extensions 98 formed with bridge connections 100.

It should be understood from the drawings and the description herein that the outer surface 94 can have an unshown decorative layer adhered to it in order for the storage structure 12 and the lid 22 to blend in with other trim elements within the vehicle 10.

The recesses 96 are located in the regions proximate the apertures 80 to compensate for the thick material sections created in those areas. The recesses 96 are formed to be generally parallel to the sliding members 64 of the reinforcement portion 60. Further, the recesses 96 are preferably formed between the sliding members 64, as indicated in FIGS. 16 and 17.

The inner extensions 98 are molded to extend in a downward direction (relative to FIGS. 15-17 and around an upper region of each of the sliding members 64. Each of the extensions 98 extends into corresponding ones of the first and second recesses 76 and 78, as shown in FIG. 17. Further, the inner extensions 98 further extend into the apertures 80 forming bridge connections 100, as shown in FIGS. 15 and 16, and further indicated in FIG. 8.

Each of the bridge connections 100 is a loop or ring that is integrally formed as part of the flexible portion 62, thereby providing continuous material extending through the apertures 80. The bridge connections 100 extend completely through respective ones of the apertures 80 of the sliding members 64 thus forming a series of loops or chain type mechanical connections between the flexible portion 62 and each of sliding members 64 of the reinforcement portion 60. Each of the sliding members 64 has a plurality of apertures 80. The flexible portion 62 has a corresponding number of bridge connections 100 for each of the sliding members 64, thereby providing a solid mechanical coupling to each of the sliding members 64.

It should be understood from the drawing and the description herein that the sliding members 64 of the reinforcement portion 60 and the flexible portion 62 of the lid 22 can further be adhered or bonded to one another as a result of molding processes. Specifically, the mechanical connection provided by the bridge connections 100 can be further enhanced by an additional (but optional) adhesive bond between the inner extensions 98 of the flexible portion 62 and the sliding members 64.

As used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle storage structure comprising:
   a vehicle trim component including a mounting portion and a pair of generally parallel tracks at least partially defining an access opening of the trim component; and
   a flexible lid slidably disposed between the tracks for movement between a closed position and an open position relative to the access opening, the lid including a flexible portion and a reinforcement portion coupled to the flexible portion, the flexible portion being further configured and arranged to span the access opening when the lid is in the closed position, the reinforcement portion having a plurality of sliding members, each sliding member having a corresponding hard, rigid reinforcement insert, the reinforcement insert being a one-piece metallic member embedded in an outer reinforcing material and completely surrounded by the outer reinforcing material, the plurality of sliding members being disposed at generally parallel spaced apart locations with opposite free ends of each of the sliding members and corresponding reinforcement inserts being located in the tracks, respectively, and the free ends of each of the sliding members and corresponding reinforcement inserts being dimensioned such that the free ends of each of the reinforcement inserts are spaced apart from respective surfaces of the tracks with only the outer reinforcing material contacting surfaces of the tracks.

2. The vehicle storage structure as set forth in claim 1, wherein
   the flexible portion of the lid is at least partially formed with an elastomeric material.

3. The vehicle storage structure as set forth in claim 1, wherein
   the sliding members are at least partially formed with a nylon material.

4. The vehicle storage structure as set forth in claim 1, wherein
the flexible portion of the lid is fixedly connected to the reinforcement portion to form living hinges between adjacent ones of the reinforcement inserts.

5. The vehicle storage structure as set forth in claim 1, wherein
the trim component is a center console unit configured for installation between front passenger seats within a vehicle.

6. The vehicle storage structure as set forth in claim 1, wherein
each of the sliding members of the lid includes a center rib section that extend generally parallel to one another and approximately perpendicular to the tracks, and a pair of outwardly extending posts that extend into the tracks.

7. The vehicle storage structure as set forth in claim 6, wherein
each of the tracks includes a plurality of spaced apart narrowed portions that are configured to selectively apply a compressive force on the posts of the sliding members to restrict movement of the lid.

8. The vehicle storage structure as set forth in claim 1, wherein
each of the reinforcement inserts has a center section with a height extending perpendicularly relative to a plane of the access opening that is greater than a width of the reinforcement inserts extending perpendicularly relative to the height.

9. The vehicle storage structure as set forth in claim 8, wherein
the center sections of the reinforcement inserts of the lid are generally rectangular in lateral cross section.

10. A vehicle storage structure comprising:
a vehicle trim component including a mounting portion and a pair of generally parallel tracks at least partially defining an access opening of the trim component; and
a flexible lid slidably disposed between the tracks for movement between a closed position and an open position relative to the access opening, the lid including a flexible portion and a reinforcement portion coupled to the flexible portion, the flexible portion being configured and arranged to span the access opening when the lid is in the closed position, the reinforcement portion including an array of reinforcement ribs, each of the reinforcement ribs having a first lateral side and a second lateral side with at least one aperture extending through the reinforcing rib from the first lateral side to the second lateral side of the reinforcement rib, and respective sections of the flexible portion extending completely through each respective one of the apertures in each of the reinforcement ribs forming a bridged connection between the flexible portion and each of the reinforcement ribs of the reinforcement portion.

11. The vehicle storage structure as set forth in claim 10, wherein
each of the reinforcement ribs has a plurality of the apertures, and the flexible portion extends completely through the apertures to form a plurality of the bridged connections.

12. The vehicle storage structure as set forth in claim 10, wherein
each of the reinforcement ribs includes a reinforcement insert disposed at least partially therein.

13. The vehicle storage structure as set forth in claim 12, wherein
each of the reinforcement inserts includes at least two longitudinally spaced apart extensions, with the aperture being aligned and located between adjacent ones of the extensions.

14. The vehicle storage structure as set forth in claim 10, wherein
each of the tracks includes a plurality of spaced apart narrowed portions and a plurality of guide portions therebetween, the narrowed portions being configured to apply a compressive force on portions of the lid to restrict movement of the lid.

15. The vehicle storage structure as set forth in claim 14, wherein
each of the reinforcement ribs of the lid includes a corresponding pair of posts extending from opposite ends of the reinforcement ribs into the tracks.

16. The vehicle storage structure as set forth in claim 10, wherein
each of the reinforcement ribs has a first recess extending lengthwise along the first lateral side and a second recess extending lengthwise along the second lateral side with corresponding sections of the flexible portion extending into the first and second recesses.

17. The vehicle storage structure as set forth in claim 16, wherein
each of the reinforcement ribs includes a rigid reinforcement insert embedded in an outer reinforcing material that is less rigid than the reinforcement insert.

18. The vehicle storage structure as set forth in claim 17, wherein
each of the reinforcement ribs has a plurality of the apertures in the outer reinforcing material and the flexible portion extends completely through the apertures to form a plurality of the bridged connections.

19. The vehicle storage structure as set forth in claim 18, wherein
each of the reinforcement insert has a plurality of longitudinally spaced apart extensions, with each of the apertures being aligned and located between adjacent ones of the extensions.

20. A vehicle storage structure comprising:
a vehicle trim component including a mounting portion and a pair of generally parallel tracks at least partially defining an access opening of the trim component; and
a flexible lid slidably disposed between the tracks for movement between a closed position and an open position relative to the access opening, the lid including a flexible portion and a reinforcement portion coupled to the flexible portion, the flexible portion being further configured and arranged to span the access opening when the lid is in the closed position, the reinforcement portion having members, each sliding member having a corresponding hard, rigid reinforcement insert, the reinforcement insert being embedded in an outer reinforcing material and completely surrounded by the outer reinforcing material, the plurality of sliding members being disposed at generally parallel spaced apart locations with opposite free ends of each of the sliding members and corresponding reinforcement inserts being located in the tracks, respectively, the free ends of each of the sliding members and corresponding reinforcement inserts being dimensioned such that the free ends of each of the reinforcement inserts are spaced apart from respective surfaces of the tracks with only the outer reinforcing material contacting surfaces of the tracks, and each of the tracks including a plurality of spaced apart narrowed portions and a plurality of guide portions disposed between the narrowed portions, the narrowed portions being configured to selectively apply a compressive force on portions of the lid to restrict movement of the lid.

21. A vehicle storage structure comprising:

a vehicle trim component including a mounting portion and a pair of generally parallel tracks at least partially defining an access opening of the trim component, each of the tracks including a plurality of spaced apart narrowed portions and a plurality of guide portions disposed between the narrowed portions; and a flexible lid including a plurality of reinforcement inserts, each reinforcement insert being completely embedded within an outer reinforcement material, the plurality of reinforcement inserts and corresponding outer reinforcement materials dimensioned to define a corresponding plurality of posts extending laterally from opposite sides of the lid into the tracks for sliding movement between a closed position and an open position relative to the access opening, the posts being dimensioned to freely slide along the guide portions of the track and be placed under compression at the narrowed portions of the track, each of the posts being further dimensioned to prevent the reinforcement inserts from contacting surfaces of the tracks such that only the outer reinforcing material surrounding the reinforcement inserts contacts the surfaces of the tracks, wherein the reinforcement inserts are metallic reinforcement inserts disposed at generally parallel spaced apart locations along the lid with a pair of free ends of each of the metallic reinforcement inserts being located in the tracks.

22. The vehicle storage structure as set forth in claim 21, wherein
the posts have circularly configured transverse cross section at areas that engage the tracks.

23. The vehicle storage structure as set forth in claim 21, wherein
each of the metallic reinforcement inserts is completely embedded in the outer reinforcing material, the outer reinforcing material being a non-metallic material.

24. The vehicle storage structure as set forth in claim 21, wherein
the outer reinforcing material is at least partially formed with a nylon or nylon like material that overlies the metallic reinforcement inserts.

25. The vehicle storage structure as set forth in claim 21, wherein
the lid includes a flexible portion that is fixedly connected to the reinforcement portion.

26. The vehicle storage structure as set forth in claim 21, wherein
the trim component is a center console unit configured for installation between front passenger seats within a vehicle.

27. The vehicle storage structure as set forth in claim 21, wherein
each of the tracks includes a first guide wall and a second guide wall spaced apart from one another in the guide portions by a first distance and spaced apart from one another in the narrowed portions by a second distance, the second distance being smaller than the first distance.

28. The vehicle storage structure as set forth in claim 27, wherein
the posts have a diameter that is greater than the second distance but less than or equal to the first distance.

29. The vehicle storage structure as set forth in claim 21, wherein
the lid includes a flexible portion that extends between the plurality of reinforcement inserts and the corresponding outer reinforcement materials and is at least partially formed with an elastomeric material.

30. The vehicle storage structure as set forth in claim 29, wherein
the flexible portion of the lid includes a plurality of bridge connections that extend through apertures formed in each of the outer reinforcement materials.

* * * * *